(12) United States Patent
Boutwell et al.

(10) Patent No.: US 7,364,807 B2
(45) Date of Patent: Apr. 29, 2008

(54) THERMAL BARRIER COATING/ENVIRONMENTAL BARRIER COATING SYSTEM FOR A CERAMIC-MATRIX COMPOSITE (CMC) ARTICLE TO IMPROVE HIGH TEMPERATURE CAPABILITY

(75) Inventors: Brett Allen Rohrer Boutwell, Liberty Township, OH (US); Irene Spitsberg, Loveland, OH (US); Christine Govern, Cincinnati, OH (US); Bangalore A. Nagaraj, West Chester, OH (US); Brian Thomas Hazel, West Chester, OH (US); Ramgopal Darolia, West Chester, OH (US); Curtis Alan Johnson, Niskayuna, NY (US); Yan Gao, Niskayuna, NY (US); Mark Daniel Gorman, West Chester, OH (US)

(73) Assignee: General Electric Company, Schenectady, NY (US)

( * ) Notice: Subject to any disclaimer, the term of this patent is extended or adjusted under 35 U.S.C. 154(b) by 160 days.

(21) Appl. No.: 11/006,292

(22) Filed: Dec. 6, 2004

(65) Prior Publication Data
US 2006/0121293 A1 Jun. 8, 2006

(51) Int. Cl.
B32B 15/04 (2006.01)
B32B 18/00 (2006.01)

(52) U.S. Cl. ............... 428/701; 416/241 R; 416/241 B
(58) Field of Classification Search ............ 416/241 R, 416/241 B; 428/701
See application file for complete search history.

(56) References Cited

U.S. PATENT DOCUMENTS

| | | | |
|---|---|---|---|
| 3,935,159 A | 1/1976 | Demillecamps et al. | 524/431 |
| 4,535,033 A | 8/1985 | Stecura | 428/633 |
| 5,683,761 A | 11/1997 | Bruce et al. | |
| 5,780,110 A | 7/1998 | Schaeffer et al. | 427/327 |
| 5,792,521 A | 8/1998 | Wortman | 427/567 |
| 5,871,820 A | 2/1999 | Hasz et al. | 427/419.2 |
| 5,914,189 A | 6/1999 | Hasz et al. | 428/335 |
| 5,985,470 A | 11/1999 | Spitsberg et al. | 428/689 |
| 6,025,078 A | 2/2000 | Rickerby et al. | 428/469 |
| 6,117,560 A | 9/2000 | Maloney | 428/472 |
| 6,177,200 B1 | 1/2001 | Maloney | 428/472 |
| 6,258,467 B1 | 7/2001 | Subramanian | 428/633 |
| 6,284,323 B1 | 9/2001 | Maloney | 427/419.2 |
| 6,319,614 B1 | 11/2001 | Beele | 428/469 |
| 6,410,148 B1 | 6/2002 | Eaton, Jr. et al. | 428/446 |
| 6,444,335 B1 | 9/2002 | Wang et al. | 428/701 |
| 6,620,465 B2 | 9/2003 | Rigney et al. | 427/567 |

(Continued)

OTHER PUBLICATIONS

"New ZrO2—Yb2O3 plasma-sprayed coatings for thermal barrier applications" by Stephan Stecura; Thin Solid Films; vol. 150 Iss 1 pp. 15-40; Jun. 22, 1987.*

(Continued)

Primary Examiner—John J. Zimmerman
Assistant Examiner—Aaron Austin
(74) Attorney, Agent, or Firm—Harrington & Smith, PC (57) ABSTRACT

In accordance with an embodiment of the invention, an article is provided. The article comprises a substrate comprised of silicon containing material, an environmental barrier coating (EBC) overlying the substrate and a thermal barrier coating (TBC) on the environmental barrier coating. The thermal barrier coating comprising a compound having a rhombohedral phase.

37 Claims, 4 Drawing Sheets

U.S. PATENT DOCUMENTS

| | | | |
|---|---|---|---|
| 6,620,525 B1 | 9/2003 | Rigney et al. | 428/633 |
| 6,730,422 B2 | 5/2004 | Litton et al. | 428/701 |
| 6,730,918 B2 | 5/2004 | Srivastava et al. | 250/458.1 |
| 6,733,908 B1 | 5/2004 | Lee et al. | 428/702 |
| 6,759,151 B1 | 7/2004 | Lee | 428/701 |
| 6,858,334 B1 | 2/2005 | Gorman et al. | 428/701 |
| 6,875,529 B1 | 4/2005 | Spitsberg et al. | 428/701 |
| 6,982,126 B2 | 1/2006 | Darolia et al. | 428/701 |
| 7,115,326 B2 | 10/2006 | Spitsberg et al. | 428/697 |
| 7,115,327 B2 | 10/2006 | Spitsberg et al. | 428/697 |
| 7,166,373 B2 | 1/2007 | Spitsberg et al. | 428/702 |
| 7,226,672 B2 * | 6/2007 | Litton et al. | 428/701 |
| 2002/0028344 A1 | 3/2002 | Beele | 428/632 |
| 2002/0098391 A1 | 7/2002 | Tanaka et al. | 428/697 |
| 2002/0172837 A1* | 11/2002 | Allen et al. | 428/632 |
| 2003/0108768 A1 | 6/2003 | Subramanian | 428/689 |
| 2004/0043244 A1 | 3/2004 | Bruce et al. | 428/632 |
| 2004/0175597 A1 | 9/2004 | Litton et al. | 428/702 |
| 2005/0142392 A1 | 6/2005 | Spitsberg et al. | 428/701 |
| 2005/0142394 A1 | 6/2005 | Spitsberg et al. | 428/701 |
| 2005/0142395 A1 | 6/2005 | Spitsberg et al. | 428/701 |
| 2005/0255648 A1* | 11/2005 | Bhatia et al. | 438/218 |
| 2006/0115659 A1 | 6/2006 | Hazel et al. | 428/450 |
| 2006/0121293 A1 | 6/2006 | Boutwell et al. | 428/469 |
| 2006/0121295 A1 | 6/2006 | Boutwell et al. | 428/469 |
| 2006/0166016 A1 | 7/2006 | Spitsberg et al. | 428/471 |
| 2006/0166018 A1 | 7/2006 | Spitsberg et al. | 428/471 |

OTHER PUBLICATIONS

"Synthesis and Properties of $M_4Zr_3O_{12}$ and $M_4Hf_3O_{12}$ Compounds (M- Rare Earth Element)" by L.M Lopato, V.P. Red'ko, G.I. Gerasimyuk and A.V. Shevchenko; Neorganicheskie Materialy; vol. 27 Iss 8 pp. 1718-1722; as presented by "Inorganic Materials" vol. 27 Iss 5 pp. 1445-1449; 1991. (translation).*

Wu, J. et al., "Low-Thermal-Conductivity Rare-Earth Zirconates for Potential Thermal-Barrier-Coating Applications", Dec. 2002, pp. 3031-3035, Journal of the American Ceramic Society, vol. 85, No. 12.

Hill, M.D. et al., "Creating an Effective Barrier", Internet Article Posted Sep. 4, 2003, pp. 1-5, http://www.ceramicindustry.com/CDA/ArticleInformation/coverstory/BNPCoverstoryIte.

"Next Generation Thermal Barrier Coatings Using DVD", pp. 1-8, Internet Article http://www.ipm.virginia.edu/newresearch/tbc/home.php, Intelligent Processing of Materials LA, Research at IPM Laboratories.

Bruce, Robert W., "Development of 1232° C.(2250° F.) Erosion and Impact Tests for Thermal Barrier Coatings©", 12 pgs., Tribology Transactions, vol. 41 (1998).

Patent Abstracts of Japan, F. Takayuki, "Production of Multilayer Ceramic Material", vol. 2000, No. 12, Jan. 3, 2001, publication No. 2000 2647 46 A.

Yirong He et al., "Development of Refractory Silicate-YSZ Dual Layer TBCs", NASA/TM-1999-209079, Jul. 1999, XP002363430 retrieved from the Internet: URL:http://gltrs.grc.nasa.gov/reports/1999/TM-1999-209079.pdf, 19 pages.

Levi, Carlos G., "Emerging Materials and Processes for Thermal Barrier Systems", pp. 1-34.

Stecura, S., "New $ZrO_2$-$YbO_3$ Plasma-Sprayed Coatings for Thermal Barrier Applications", Jun. 22, 1987, pp. 15-40, Thin Solid Films, vol. 150, Issue 1.

Ueno Shunkichi et al.: "Development of oxide-based EBC . . . ", Int. J. Appl. Ceram. Technol.; vol. 1, No. 4, Oct. 2004, pp. 362-373.

US 11/170,469 filed Jun. 28, 2005.

Zhu D. et al.: "Thermal conductivity and stability . . . " NASA/TM-2003-212544, Nov. 2003, 11 pages.

Vargas et al., "Alumina Al2O3 (110): An ab-initio Examination of the Surface Electronic Structure," 5 pages.

* cited by examiner

THERMAL BARRIER COATING/ENVIRONMENTAL BARRIER COATING SYSTEM FOR A CERAMIC-MATRIX COMPOSITE (CMC) ARTICLE TO IMPROVE HIGH TEMPERATURE CAPABILITY

GOVERNMENT RIGHTS

The invention was made in part under contract number N00421-00-3-0536 awarded by the Government (Navy). Accordingly, the Government has certain rights in this invention.

CROSS-REFERENCE TO RELATED APPLICATION

The subject application shares certain attributes with U.S. Ser. No. 11/006,367, entitled, "Low Thermal Conductivity Thermal Barrier Coating System and Method Therefor" and with U.S. Ser. No. 11/006,368, entitled, "Sintering Resistant, Low Conductivity, High Stability Thermal Barrier Coating/Environmental Barrier Coating System For A Ceramic-Matrix Composite (CMC) Article To Improve High Temperature Capability", each of which are filed concurrently herewith.

FIELD OF THE INVENTION

This invention relates to coating systems suitable for protecting components exposed to high-temperature environments, such as the hostile thermal environment of a gas turbine engine. More particularly, the invention relates to a thermal barrier coating (TBC) for inclusion in a thermal barrier coating/environmental barrier coating (EBC) system (TBC/EBC system) for use on silicon containing material substrates and/or components, and wherein the TBC is characterized by multiple beneficial properties including a low thermal conductivity, strong resistance to hostile environmental effects (e.g. erosion), strong resistance to sintering and good phase stability.

BACKGROUND OF THE INVENTION

Higher operating temperatures for gas turbine engines are continuously sought in order to increase efficiency. However, as operating temperatures increase, the high temperature durability of the components of the engine must correspondingly increase. In this regard, materials containing silicon, particularly those with silicon carbide (SiC) as a matrix material or a reinforcing material, are currently being used for high temperature applications, such as for combustor and other hot section components of gas turbine engines, because of the excellent capacity of these silicon materials to operate at higher temperatures.

However, it has been found that silicon containing substrates can recede and lose mass as a result of a formation volatile Si species, particularly $Si(OH)_x$ and SiO when exposed to high temperature, aqueous environments. For example, silicon carbide when exposed to a lean fuel environment of approximately 1 ATM pressure of water vapor at 1200° C. will exhibit weight loss and recession at a rate of approximately 152.4 microns per 1000 hrs. It is believed that the process involves oxidation of the silicon carbide to form silica on the surface of the silicon carbide followed by reaction of the silica with steam to form volatile species of silicon such as $Si(OH)_x$.

Methods such as described in U.S. Pat. No. 5,985,970 to Spitsberg et al., U.S. Pat. No. 6,410,148, U.S. Pat. No. 6,444,335 to Wang, et al, the disclosures of which are each all hereby incorporated by reference in their entirety, have dealt with the above problems concerning use of the silicon containing material substrates by providing a sufficient environmental barrier coating (EBC) for these substrates which inhibits the formation of volatile silicon species, $Si(OH)_x$ and SiO, thereby reduce recession and mass loss, and which provides thermal protection to and closely matches the thermal expansion of the silicon based substrate. In each of these systems, a conventional thermal barrier coating (TBC) comprising yttria stabilized zirconia (7% YSZ) is generally employed as a top layer to their respective EBC's in forming their TBC/EBC systems.

Nevertheless, as application temperatures increase beyond the thermal capability of a Si-containing material (limited by a melting temperature of about 2560° F. (about 1404° C.) for silicon), TBC/EBC systems utilizing conventional TBC's such as 7% YSZ may not adequately protect the underlying silicon containing material component. Namely, the thermal conductivities of TBC materials, such as YSZ, are known to increase over time when subjected to the operating environment of a gas turbine engine. In order for a TBC to remain effective throughout the planned life cycle of the component it protects, it is important that the TBC has and maintains a low thermal conductivity throughout the life of the component, including high temperature excursions. As possible solutions to these high temperature operating problems, TBCs for gas turbine engine components are often deposited to a greater thickness than would otherwise be desirable. Consequently, multiple layers are thus often added to some YSZ TBCs to correct deficiencies resulting in unwanted increased thickness of the coating system. Alternatively, internally cooled components, such as blades and nozzles, must be designed to have higher cooling flow. However, the above solutions may be undesirable for reasons relating to cost, weight, component life and engine efficiency.

In view of the above, it can be appreciated that further improvements in TBC technology are desirable, particularly as TBCs are employed to thermally insulate silicon containing material components intended for more demanding engine designs. A TBC having multiple beneficial effects, such as a low thermal conductivity, strong resistance to sintering, strong resistance to erosion, sufficiently long life and phase stability would allow for higher component surface temperatures and reduced coating thickness for the same surface temperature. Reduced TBC thickness, especially in applications like combustors often employing relatively thick TBCs, would result in a significant cost reduction and weight benefit. Additionally, thinner coatings on turbine blades and vanes would result in improved aerodynamic efficiencies and lower weight.

BRIEF DESCRIPTION OF THE INVENTION

In accordance with an embodiment of the invention, an article is provided. The article comprises a substrate comprised of a silicon containing material;
 an environmental barrier coating (EBC) overlying the substrate; and a thermal barrier coating (TBC) on the environmental barrier coating. The thermal barrier coating comprises a compound having a rhombohedral phase.

In accordance with another embodiment of the invention, a gas turbine engine component formed of a silicon containing material and having a thermal/environmental barrier coating system on a surface thereof is provided. The thermal/environmental barrier coating system comprises an environmental barrier coating (EBC) comprising a bond layer, a first layer and a second layer. The bond layer is located on the surface between the first layer and the substrate and comprises at least one of silicon metal and silicon dioxide. Moreover, the first layer is located on the bond layer and comprises at least one of mullite, mullite-barium strontium aluminosilicate, mullite-yttrium silicate and mullite-calcium aluminosilicate in an amount of between about 40 to 80 wt. % mullite and between about 20 to 60 wt. % barium strontium aluminosilicate, ytrium silicate or calcium aluminosilicate. The second layer of the EBC is located on the first layer of the EBC and comprises barium strontium aluminosilicate. The thermal/environmental barrier coating system further comprises a thermal barrier coating (TBC) on the EBC. The TBC comprises a compound having a rhombohedral phase, and the TBC comprises a primary constituent portion and a stabilizer portion stabilizing the primary constituent. The primary constituent portion of the thermal barrier coating comprises at least one of hafnia present in an amount of at least about 100 mol % of the primary constituent, zirconia present in an amount of at least about 100 mol % of the primary constituent, a mixture of hafnia and zircona wherein zirconia is present in an amount of from about 0 mol % to about 95% mol % of the primary constituent and hafnia is present in an amount from about 5 to about 100 mol % of the primary constituent. The stabilizer portion of the thermal barrier coating comprises at least one of: Yb, Ho, Er, Tm, Lu, and mixtures thereof present in the amount of about 35 to about 75% by wt of the thermal barrier coating. In addition, the thermal/environmental barrier coating system optionally comprises a coefficient of thermal expansion (CTE) transition layer between the TBC and the EBC, with the CTE transition layer having a CTE between that of the TBC and EBC. Further, the CTE transition layer comprises a TBC matching CTE portion and a EBC matching CTE portion, wherein the TBC matching portion comprises at least one of a metal oxide stabilized hafnia composition, a metal oxide stabilized zirconia composition, a metal oxide stabilized hafnia/zirconia composition and mixtures thereof, and wherein the EBC matching CTE portion comprises at least one of BSAS, mullite, alumina and any mixtures thereof.

In accordance with another embodiment of the invention, a method for producing a thermal barrier coating/environmental barrier coating system on a silicon containing material substrate is provided. The method comprises applying an environmental barrier coating (EBC) over the silicon containing material substrate; and then applying a thermal barrier coating (TBC) over the EBC. The thermal barrier coating comprises a compound having a rhombohedral phase.

Advantageously, embodiments of the invention provide a thermal barrier coating having a rhombohedral phase (described in more detail below) and which also provide multiple beneficial properties or effects. The beneficial properties provided by the TBC include low thermal conductivity, strong resistance to sintering, strong resistance to erosion, sufficiently long life of the TBC and good phase stability. The advantage of having a TBC with such multiple benefits, is that when it used as part of a combined TBC/EBC system, this system not only provides sufficient thermal and environmental protection to underlying silicon material components and/or substrates, but this system does so without the use of additional layers, which would result in an increased thickness for the coating system. As mentioned, increased thickness of the TBC/EBC system often translates into problems relating to cost, component life and engine efficiency. It is further believed that the rhombohedral phase of the TBC compound is at least partly, if not fully, responsible for these beneficial properties exhibited by the TBC.

Other features and advantages will be apparent from the following more detailed description, taken in conjunction with the accompanying drawings, which illustrate by way of example the principles of the invention.

DETAILED DESCRIPTION OF THE INVENTION

Embodiments of the present invention improve upon prior TBC/EBC systems used upon silicon containing material substrates and/or components utilized in high temperature applications. The present invention does so by providing a thermal barrier coating having a rhombohedral phase, wherein this TBC exhibits beneficial properties such as low thermal conductivity, strong resistance to erosion, improved phase stability, better resistance to sintering, thereby allowing the silicon material containing substrate and/or component to operate at higher temperatures and also for longer durations than some conventional TBC/EBC systems which utilize conventional thermal barrier coatings such as 7% YSZ. Moreover, it is believed that the rhombohedral phase is at least partially, if not fully responsible for the above beneficial properties exhibited by the TBC of the invention. Some examples of TBC/EBC systems of embodiments of the present invention are discussed below.

Figure 1:
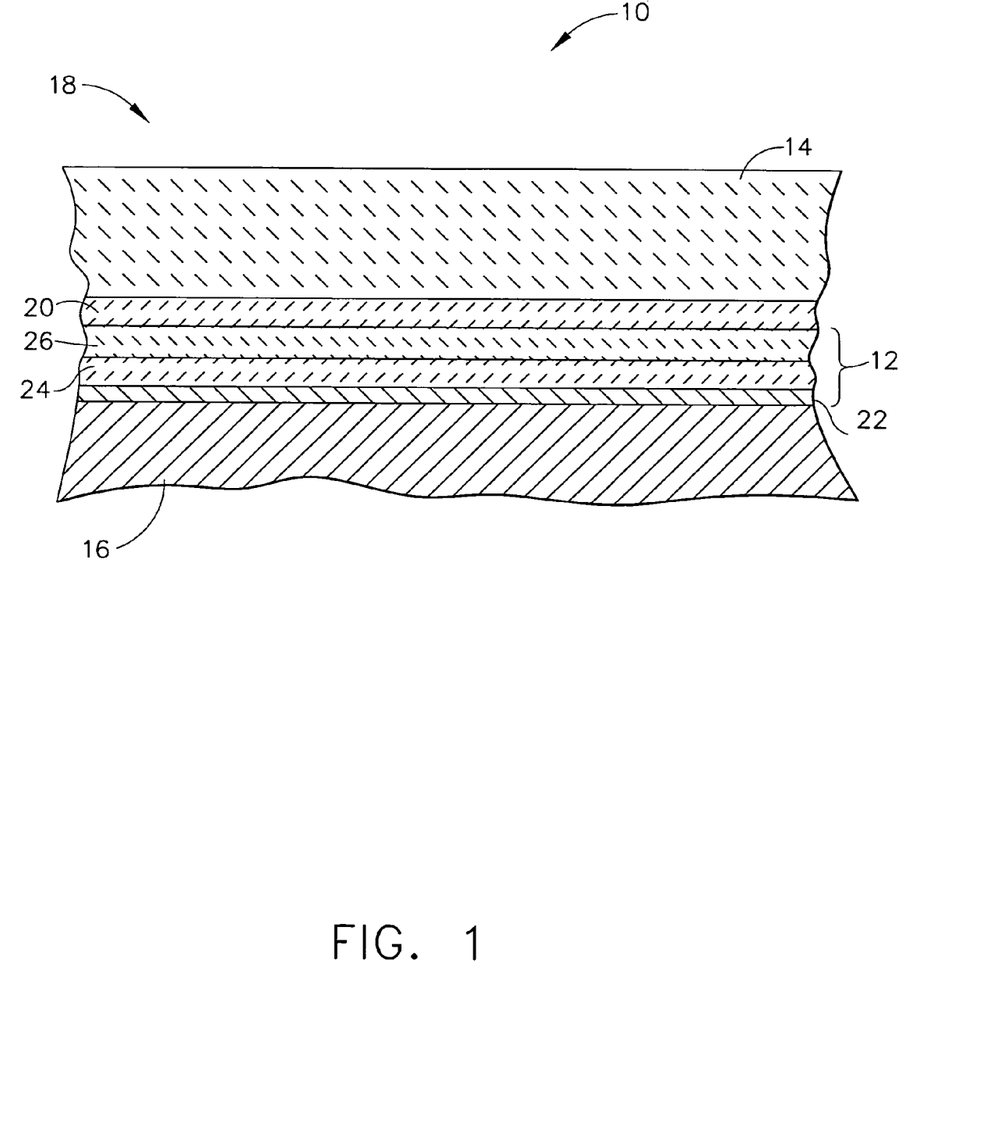
FIG. 1 is a cross-sectional view of a gas turbine engine component formed of a Si-containing material and having a thermal/environmental barrier coating system in accordance with an embodiment of the invention.

Referring to FIG. 1, a TBC/EBC system 10 of a first embodiment of the present invention is shown. The TBC/EBC system 10 includes an EBC 12, a TBC 14 or top coat and a surface region 16 or substrate of a hot section component 18. The TBC/EBC system of the first embodiment further optionally comprises a CTE transition layer 20 in between the TBC 14 and EBC 12. The component 18, or at least the surface region (substrate) 16 of the component 18, is formed of a silicon-containing material (particularly those for articles exposed to high temperatures), such as SiC/SiC ceramic matrix composites (CMC). However, the invention is generally applicable to other materials containing silicon in any form. For example, other silicon containing materials for use herein include, but are not limited to, those with a dispersion of silicon carbide, silicon carbide and/or silicon particles as a reinforcement material in a metallic or nonmetallic matrix, as well as those having a silicon carbide, silicon nitride and/or silicon-containing matrix, and particularly composite materials that employ silicon carbide, silicon nitride and/or silicon as both the reinforcement and matrix materials (e.g., SiC/SiC ceramic matrix composites (CMC)).

In addition, examples of components 18 which may be used herein include, but are not limited to, combustor components, blades, shrouds, flaps, seals, vanes, and other hot section components of gas turbine engines.

The surface region 16 of the component 18 is protected by the multilayer TBC/EBC system 10 that includes the EBC 12 for providing environmental protection to the component 10 and a top coat or TBC 14 provided on top of the EBC for providing thermal insulation to the underlying CTE transition layer 20, EBC layer(s) 12 and component 18. A suitable thickness range for the TBC 14 is about 12.5 to about 1250 microns (about 0.0005 to about 0.050 inch), with a preferred range of about 76.2 microns to about 254 microns (0.003 to about 0.010 inch, depending upon the particular application.

The TBC 14 of the TBC/EBC system 10 comprises a compound having a rhombohedral phase. In particular, the TBC 14 comprises a primary constituent and a stabilizer portion combined together to form the TBC 14 material having a rhombohedral phase. In one embodiment, the TBC 14 comprises a $Yb_2O_3$ (stabilizer) and a $ZrO_2$ (primary constituent) to form a $Yb_4Zr_3O_{12}$ TBC compound having a rhombohedral phase. In another embodiment, the TBC 14 comprises $Yb_4Zr_3O_{12}$ having a rhombohedral crystalline structure with a hexagonal setting. It is noted that the rhombohedral crystalline structure with a hexagonal setting embodiment is a narrower embodiment encompassed within the rhombodhedral phase embodiment. It is also noted that the phrase a rhombohedral crystalline structure with a hexagonal setting is used interchangeably throughout this application to mean a structure with a space group of R-3 and space group number of 148 described in the International Tables for Crystallography. Further, the rhombohedral phase embodiment and the rhombohedral crystalline structure with a hexagonal setting embodiment each function at least in part, if not fully, to provide the beneficial properties of the TBC 14 mentioned herein.

In some embodiments of the invention, the primary constituent portion of the TBC 14 is comprised entirely of zirconia (100 mol % of the primary constituent) and the stabilizer portion of the TBC comprises other stabilizers in addition to or in lieu of $Yb_2O_3$ (Ytterbium Oxide), including but not limited to the rare earth oxides $Ho_2O_3$ (Holmium Oxide), $Er_2O_3$ (Erbium Oxide), $Tm_2O_3$ (Thulium Oxide) and $Lu_2O_3$ (Lutetium Oxide) and mixtures thereof to form a TBC 14 (of either $Ho_4Zr_3O_{12}$, $Er_4Zr_3O_{12}$, $Tm_4Zr_3O_{12}$, $Lu_4Zr_3O_{12}$, respectively) having the same rhombohedral zirconate phase or R-3 space group/Group #148 structure and properties as the $Yb_4Zr_3O_{12}$ TBC 14 discussed above. In other embodiments, the primary constituent of the TBC 14 is comprised entirely of hafnia (100 mol % of the primary constituent) and the stabilizer portion of the TBC 14 comprises rare earth oxide stabilzers including but not limited to $Yb_2O_3$, $Ho_2O_3$, $Er_2O_3$, $Tm_2O_3$ and $Lu_2O_3$ and mixtures thereof to form a TBC 14 (of either $Yb_4Hf_3O_{12}$, $Ho_4Hf_3O_{12}$, $Er_4Hf_3O_{12}$, $Tm_4Hf_3O_{12}$, $Lu_4Hf_3O_{12}$, respectively) having a rhombohedral hafnia phase or R-3 Space Group/Group #148 structure, and exhibiting the same beneficial properties as the rhombohedral zirconate phase embodiments described above.

In other embodiments, the primary constituent portion of the TBC 14 is comprised of a hafnia/zirconia mixture (i.e. hafnia present in an amount of from about 5 to 100 mol % of the primary constituent and zirconia is present in an amount of from about 0 to 95 mol % of the primary constituent) and wherein the stabilizer portion of the TBC 14 comprises rare earth oxide stabilizers including but not limited to $Yb_2O_3$, $Ho_2O_3$, $Er_2O_3$, $Tm_2O_3$ and $Lu_2O_3$ and mixtures thereof to form a TBC 14 having a rhombohedral phase with the beneficial properties described above. In still further embodiments, hafnia present in an amount of from about 95 to 100 mol % of the primary constituent and zirconia is present in an amount of from about 0 to 5 mol % of the primary constituent and is alloyed to one or more of the above rare earth oxide stabilizers to form the TBC 14 having a rhombohedral phase.

It is further noted that when hafnia is incorporated into the TBC 14 in amount of at least about 5 mol % and upwards of the primary constituent of the TBC 14, as in certain embodiments of the invention described above, these hafnia embodiments provide not only the same beneficial properties and rhombohedral phase structure as the other TBC/EBC embodiments mentioned herein, but these hafnia embodiments additionally provide an even greater level of resistance to sintering than other embodiments of the invention which do not include hafnia as a TBC constituent in the required amounts (5 mol % and upwards of the primary constituent of the TBC 14). Namely, this hafnia incorporation will reduce the degree of sintering present in the coating, better protecting the nature of the TBC 14 layer and underlying EBC 12 and silicon containing material component 18. Additionally, hafnia relative to zirconia, serves to reduce the thermal conductivity of the TBC 14 due to the differences in specific heat and atomic mass which can increase phonon scattering. Further, the reduced sintering will prevent the conductivity from increasing by better retaining the deposited porosity level of the TBC 14.

The stabilizer portion (e.g. $Yb_2O_3$ and/or other rare earth oxide stabilzers mentioned herein) of the TBC 14 is present in a concentration of preferably at least about 35% to about 75% by weight (based upon the combined weight of the resulting compound) prior to being combined with the primary constituent in order to form a TBC 14 compound having a rhombohedral phase (e.g. rhombohedral crystalline structure with a hexagonal setting), along with the beneficial properties discussed. The reason for the above stabilizer range is that it has been observed experimentally that these rare earth oxide stabilizers applied in the above mentioned amounts (about 35 to about 75% by weight) form a TBC 14 compound having a rhombohedral phase which exhibits the beneficial properties of low thermal conductivity, strong erosion capacity, and good phase stability. For example, it has been experimentally determined (including the experimental data illustrated in Table 1 below and FIGS. 2-4) that when, for example, from about 35% to about 75% by weight of $Yb_2O_3$ (stabilizer) is combined with $ZrO_2$ (primary constituent) to form the $Yb_4Zr_3O_{12}$ TBC 14 having a rhombohedral phase (e.g., the rhombohedral crystalline structure with hexagonal setting) the TBC 14 displays the beneficial TBC properties described herein. Further, it was also experimentally determined that the rhombohedral phase (including the rhombohedral crystalline structure with hexagonal setting) of $Yb_4Zr_3O_{12}$ first resulted, beginning when at least about 35% by weight of $Yb_2O_3$ was combined with $ZrO_2$ to form the $Yb_4Zr_3O_{12}$ TBC 14 and that this rhombohedral phase was also formed throughout the range of about 35% to about 75% by weight of $Yb_2O_3$, when combined with $ZrO_2$ to form the $Yb_4Zr_3O_{12}$ TBC 14. It is also believed that the beneficial properties, as well as the rhombohedral phase also extends beyond the 75% by weight $Yb_2O_3$ concentration amount.

In addition, as mentioned earlier, the $Yb_2O_3$ and/or other rare earth oxides stabilizers discussed herein may alternatively be combined with a primary constituent comprised entirely of Hafnia ($HfO_2$) instead of $ZrO_2$ or combined with a primary constituent comprised of a mixture of hafnia and zirconia to form the TBC 14, wherein each of these options will produce a TBC 14 having the same rhombohedral phase and beneficial properties as those embodiments of the present invention in which the primary constituent of the TBC is comprised entirely of zirconia. Moreover, as mentioned above, the incorporation of hafnia (in the amounts discussed herein) into the TBC 14, besides achieving the above beneficial properties also provides a TBC and an overall TBC/EBC system with an even greater level of resistance to sintering than other embodiments of the invention which do not incorporate hafnia into the TBC in the required amounts of 5 mol % and upwards of the primary constituent.

In still further embodiments of the invention, additional rare earth oxides, including but not limited to lanthana ($La_2O_3$), yttria ($Y_2O_3$), ceria ($CeO_2$), neodymia ($Nd_2O_3$), gadolinium oxide ($Gd_2O_3$) and dysprosia ($Dy_2O_3$) and any mixtures thereof may be alloyed to any of the TBC 14 embodiments of the invention described herein to further modify certain properties of the TBC 14 (e.g. lower the thermal conductivity). These additional rare earth oxides do not change the rhombohedral phase or rhombohedral crystalline structure with hexagonal setting of the TBC 14, but rather only add to modify certain properties of the TBC 14. For example in one embodiment, any of one of $La_2O_3$, $Y_2O_3$, $CeO_2$, $Nd_2O_3$, $Gd_2O_3$, $Dy_2O_3$ or any mixtures thereof could be alloyed with $Yb_4Zr_3O_{12}$. TBC 14 to further lower the thermal conductivity of the TBC 14.

In forming the TBC/EBC system 10 of the present invention, the TBC 14 is applied on top of the EBC 12 for thermally insulating the underlying layer(s) of the EBC 12 and the component 18. Any EBC known in the art for use with silicon containing material substrates may be used in accordance with the TBC 14 of the present invention to form the TBC/EBC system 10. Nevertheless, there are certain EBC's which are more advantageous for use with the TBC 14 of the present invention, depending upon the application.

For example, the TBC/EBC system 10 of the first embodiment depicted FIG. 1, has a multilayered EBC 12 with the optional CTE transition layer 20 located between the TBC 14 layer and EBC 12. As discussed above, the TBC 14 of this embodiment includes a compound having a rhombohedral phase, such as $Yb_4Zr_3O_{12}$. This TBC/EBC system 10 embodiment provides effective thermal and environmental protection to components having silicon containing material substrates operating at very high temperatures (e.g. 3000° F./1649° C.) over numerous thermal cycles. In this embodiment, the CTE transition layer 20 preferably has a CTE between that of the TBC 14 and EBC 12, and also plays a helpful role in allowing the operation of the component 18 (e.g. gas turbine engine component) under high temperature conditions by providing a CTE transition between the TBC 14 and EBC layers 12 to prevent spallation and debonding of the TBC/EBC coating system 10 which may occur in prior coating systems under elevated temperatures due to CTE mismatch between the layers.

In particular, the multi-layered EBC 12 of the TBC/EBC system 10 of the first embodiment, preferably has three layers, as shown in FIG. 1. These three layers of the EBC preferably include a bond layer 22, a first layer 24 and a second layer 26. The bond layer 22 overlays the silicon substrate 16 of the component 18 and preferably comprises silicon. The first layer 24 is located on the bond layer 22 and preferably comprises mullite-barrium strontium aluminosilicate in an amount of between about 40 to 80 wt. % mullite and between about 20 to 60 wt. % BSAS. Further, the second layer 26 of the EBC 12 preferably comprises BSAS. Moreover, the CTE transition layer 20 located in between the TBC 14 and EBC 12, comprises a TBC matching CTE portion together with an EBC matching CTE portion. The TBC matching CTE portion preferably comprises at least one of a metal oxide stabilized hafnia composition, a metal oxide stabilized zirconia composition, a metal oxide stabilized hafnia/zirconia mixture composition and mixtures thereof. The EBC matching CTE portion preferably comprises at least one of BSAS, mullite, alumina and any mixtures thereof. Different embodiments for the CTE transition layer are described in U.S. Pat. No. 6,444,334, and may all be used in accordance with the present invention. It is noted that the TBC/EBC system embodiments of U.S. Pat. No. 6,444,334 may be used in accordance with the present invention, simply by substituting the TBC, i.e. YSZ of the '334 patent with the TBC 14 of the present invention and also if desired by optionally modifying the CTE transition layer of the '334 patent with the TBC materials of the present invention in a manner which would be apparent to one skilled in the art based upon the teaches of the present invention and the '334 patent.

Alternatively, if lower operating temperatures are desired instead for operating the component, such as temperatures below 3000° F. (1371° C.), some notably preferred EBC's may be used in accordance with the TBC 14 of the present invention, for these applications, as well. For instance, in another embodiment, a single layer EBC, comprised preferably of BSAS, as described in U.S. Pat. No. 5,985,470 could be used with the TBC 14 of the present invention to form a TBC/EBC system 10 which provides effective thermal and environmental protection to the underlying silicon containing material. Further, in yet another embodiment of the present invention, one could also use a multi (e.g. two or three layered) EBC, as described in U.S. Pat. No. 6,410,148, wherein for example the EBC comprises a barrier layer comprising preferably BSAS and an intermediate layer, between the barrier layer and the substrate, preferably comprising mullite (40 to 80 wt %) with BSAS (20 to 60 wt. %) and optionally further comprising a bond coat layer comprising silicon in between the substrate and the intermediate layer.

Other notable embodiments for the EBC 12 which may be used in conjunction with TBC 14 on silicon containing material substrates include an EBC which is comprised of at least one of mullite, BSAS, rare earth aluminates, rare earth silicates, alkaline earth aluminates, alkaline earth silicates and mixtures thereof. In other embodiments, the EBC 12 is a single layer overlying the silicon containing material substrate and comprises at least one of mullite, BSAS, rare earth aluminates, rare earth silicates, alkaline earth aluminates, alkaline earth silicates and mixtures thereof. In yet further embodiments, the EBC 12 is a multiple layer EBC, wherein each layer of the multiple layer EBC is comprised of at least one of mullite, BSAS, rare earth aluminates, rare earth silicates, alkaline earth aluminates, alkaline earth silicates and mixtures thereof.

Figure 2:
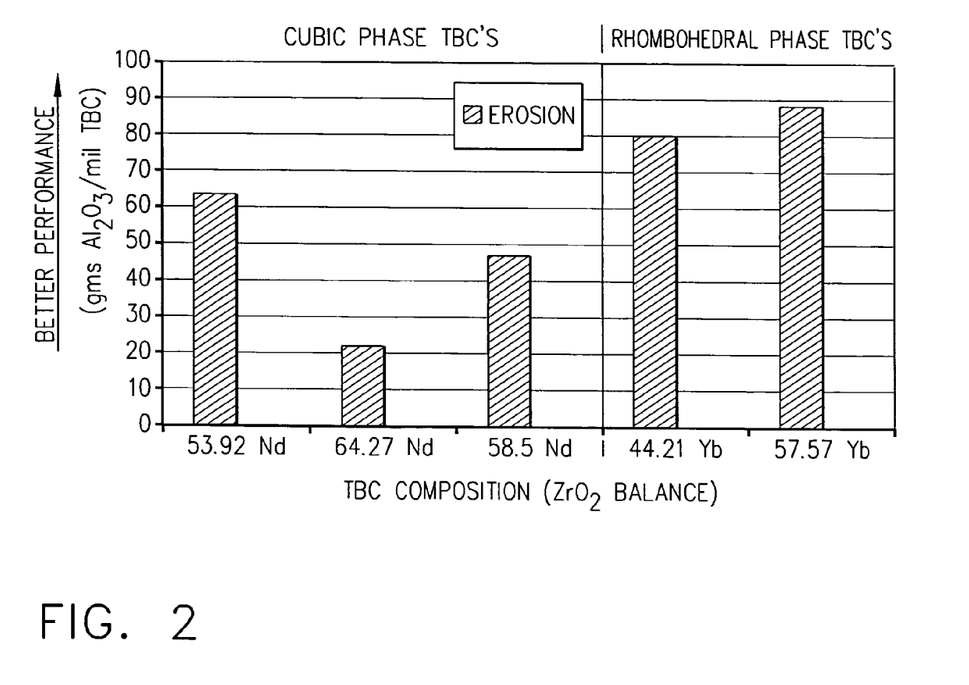
FIG. 2 illustrates erosion test results for $Nd_2O_3$—$ZrO_2$ TBCs versus a $Yb_4Zr_3O_{12}$ TBC of an embodiment of the invention.
Figure 3:
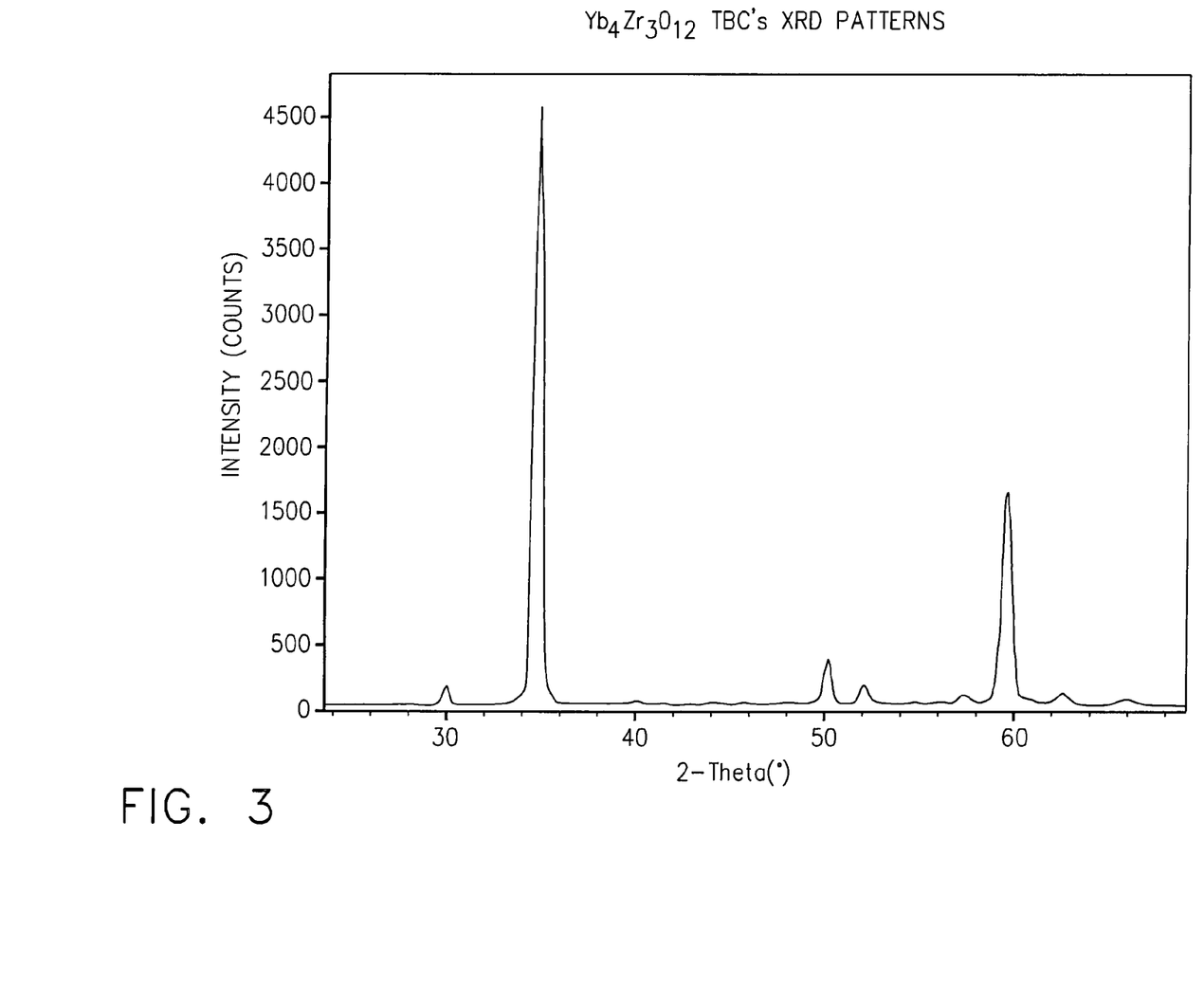
FIGS. 3-4 illustrate x-ray diffraction patterns of the $YB_4Zr_3O_{12}$ TBC's of an embodiment of the invention conducted after FCT performance tests.
Figure 4:
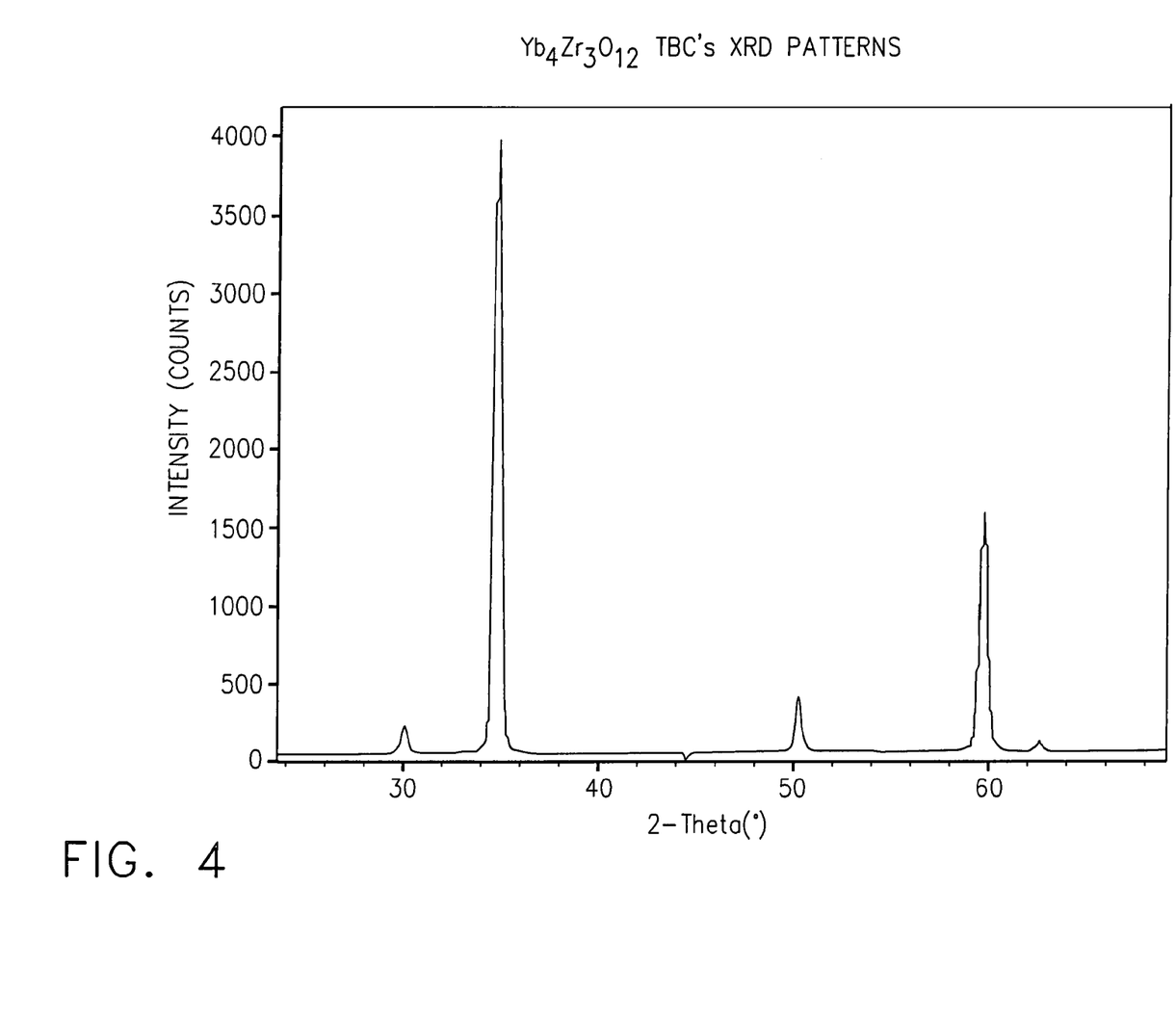

As mentioned above, any EBC known in the art for use with silicon containing material substrates may be used in accordance with the TBC 14 in forming the TBC/EBC system 10. Regardless of which EBC is used, the TBC 14 of the present invention, can provide lower thermal conductivity, improved resistance to erosion, improved resistance to sintering and improved phase stability compared to some conventional TBC's used to coat substrates comprised of silicon containing material. The test results set forth below and depicted in FIGS. 2-4 illustrate the advantages which the TBC 14 of an embodiment of the present invention provides over conventional TBC's known in the art for use with TBC/EBC systems.

For example, referring now to Table 1 below, thermal conductivities of various TBC compositions are summarized therein. Initially, prior to determining the thermal conductivity of TBC 14 in accordance with an embodiment of the invention ($Yb_4Zr_3O_{12}$ having a rhombohedral crystalline structure with a hexagonal setting) and comparison conventional TBCs (i.e. pyrochlore $Nd_2O_3$—$ZrO_2$ and industry standard 7% YSZ) and as noted in Table 1, a thermal aging treatment was conducted on the specimens at about 1200° C. for two hours. After the thermal aging treatment, the thermal conductivities were then determined for each of the TBCs at a temperature of about 890° C. using a Laser Flash measurement known in the art.

TABLE I

| TBC Chemistry | Crystal Structure | Aged Thermal Conductivity (W/m*K) |
|---|---|---|
| 7% YSZ | Tetragonal | 1.6 |
| $ZrO_2$-65 wt. % $Nd_2O_3$ | Pyrochlore | 0.9-1.0 |
| $ZrO_2$-45 wt. % $Yb_2O_3$ | Rhombohedral structure with hexagonal setting | 0.83-1.2 |

The above results indicate that the TBC coatings comprising the $Yb_4Zr_3O_{12}$ TBC 14 compound of an embodiment of the present invention having a rhombohedral crystalline structure with a hexagonal setting, in the amounts evaluated had significantly lower thermal conductivities than the conventional industry standard 7% YSZ TBC material.

Further, the rhombohedral crystalline structure with hexagonal setting $Yb_4Zr_3O_{12}$ TBC 14 embodiment of the invention also out performed the conventional pyrochlore $Nd_2O_3$—$ZrO_2$ TBC in erosion studies. These erosion test results are set forth below and depicted in FIG. 2.

FIG. 2 illustrates the results of erosion tests that were conducted on pin specimens of a conventional pyrochlore $Nd_2O_3$—$ZrO_2$ TBC in comparison to the rhombohedral crystalline structure/hexagonal setting $Yb_4Zr_3O_{12}$ TBC embodiment of the present invention, at temperatures of about 1221° C. and high gas velocities while subjected to an alumina powder injected into the gas stream. An alumina powder with an average particle size of about 50 micrometers was used to evaluate erosion resistance. The specimens were rotated at a rate of about 500 rpm while subjected to the high velocity powder. The erosion resistance was measured in terms of the number of grams of $Al_2O_3$ required to remove about 1 mil of $Al_2O_3$ of the TBC 18. These results are summarized below.

In other experiments discussed in detail below, phase stability of the rhombohedral crystalline structure of the $Yb_4Zr_3O_{12}$ TBC 14 compound embodiment was tested under rigorous conditions to simulate the working conditions of a gas turbine engine.

Specifically, in order to test the phase stability of the rhombohedral structure of the $Yb_4Zr_3O_{12}$ compound, an FCT was run on two samples of the $Yb_4Zr_3O_{12}$ compound, each compound having a rhombohedral crystalline structure with a hexagonal setting. By way of example, a first FCT test ("first run") was conducted with about 44.9 wt. % $Yb_2O_3$ and about 2.31 wt. % $Y_2O_3$ after about 255 FCT cycles at about 1163° C. (2125° F.). A second FCT ("second run") was conducted with about 47.1 wt. % $Yb_2O_3$ and about 0.59 wt. % $Y_2O_3$ after about 215 FCT cycles at about 1163° C. (2125° F.).

Next, after performing each of these runs, the samples, i.e. the $Yb_4Zr_3O_{12}$ compounds having the rhombohedral crystalline structures with a hexagonal setting, were then evaluated with x-ray diffraction analysis to test the phase stability of the crystalline structure after being subjected to the rigorous FCT tests. FIG. 3 depicts the x-ray diffraction patterns of the the $Yb_4Zr_3O_{12}$ compound of the first run after the FCT tests were conducted. FIG. 4 depicts the x-ray diffraction patterns of the the $Yb_4Zr_3O_{12}$ compound of the second run after the FCT tests were conducted.

FIGS. 3 and 4 advantageously illustrate, via the x-ray diffraction patterns, that the $Yb_4Zr_3O_{12}$ compounds still maintained their rhombohedral crystalline structure with hexagonal setting even after the rigorous FCT testing. These results thus indicate that the rhombohedral crystalline structure of the $Yb_4Zr_3O_{12}$ TBC 14 compound has very good phase stability characteristics. The x-ray diffraction results illustrated in FIGS. 3 and 4 were verified using an analysis database named Power Diffraction File 2 (PDF2). This PDF2 database is provided by the organization known as The International Center For Diffraction Data (I-CDD).

Taken as a whole, the above tests illustrated in Table 1 and FIGS. 2-4 show that the TBC 14 of the present invention is a TBC which exhibits multiple beneficial properties over conventional prior art TBC's. In particular, the TBC 14 embodiment of the invention described above ($Yb_4Zr_3O_{12}$ TBC 14) exhibited very low thermal conductivity and strong resistance to erosion. This TBC 14 also exhibited very good phase stability, as well. Often, in the prior art, a TBC will provide a beneficial effect, such as lower thermal conductivity, but fail to provide other important properties, such as resistance to hostile environmental conditions e.g. erosion or good phase stability. It is preferable to have a TBC 14, which accomplishes many different purposes so that several additional layers do not have to be added to the TBC system causing an increase in thickness. As note above, thicker TBC coating systems may be disadvantageous because these systems can increase processing and material costs.

The examples and test conditions represented in Table 1 and FIGS. 2-4 are by way of example and in no way meant to limit the scope of the invention.

While not wishing to be bound by any theory described herein, it is theorized that this rhombohedral phase, e.g. rhombohedral crystalline structure with a hexagonal setting, may at least be partially, if not fully, responsible for the beneficial properties or advantages exhibited by, for instance, the $Yb_4Zr_3O_{12}$ TBC 14 over the conventional TBC's of the prior art. Some possible reasons why the rhombohedral phase may be at least partially responsible for the beneficial properties exhibited by the TBC 14 of embodiments of the present invention over the prior art TBC's is that the complex structure of a rhombohedral phase contributes to increasing phonon scattering and thus lowers the thermal conductivity of the TBC 14 compound, e.g. $Yb_4Zr_3O_{12}$. Another possible reason why the rhombohedral phase of $Yb_4$—$Zr_3O_{12}$ may contribute to the beneficial properties of the TBC 14, is that the rhombohedral phase causes a decrease in the sintering response of the TBC 14 compound, which results in a lower thermal conductivity. The rhombohedral phase of the $Yb_4Zr_3O_{12}$ reduces the sintering response of TBC 14 because for sintering to occur, the ions of the compound must be able to diffuse through the system. However, when ions are closely packed as they are in the rhombohedral phase, diffusion becomes more difficult and the sintering response of the TBC 14 should also decrease. Yet another possible reason why the rhombohedral phase may be responsible at least partially, if not fully, responsible for the beneficial properties exhibited by the TBC 14 described above is that the rhombohedral phase has different mechanical properties than, for example, a cubic or pyrochlore TBC. It is theorized that because the rhombohedral phase has different mechanical properties it will also behave differently in erosion testing than for example a cubic or pyrochlore TBC. This theory is believed to be particularly supported by the FIG. 2 results above, wherein rhombohedral phase (e.g. in FIG. 2, a rhombohedral crystalline structure with hexagonal setting) $Yb_4Zr_3O_{12}$ TBC 18 outperformed cubic $Nd_2O_3$—$ZrO_2$ in erosion testing.

In preparing the TBC/EBC system 10, the TBC 14 of the present invention can be deposited on the EBC 12 by any techniques known in the art, including plasma spraying and PVD techniques. Further, the EBC 12 of this invention can be deposited by air and vacuum plasma spraying (APS and VPS, respectively), though it is foreseeable that deposition could be performed by other known techniques, such as physical vapor deposition (PVD), EP-PVD and high velocity oxy-fuel (HVOF).

While various embodiments are described herein, it will be appreciated from the specification that various combinations of elements, variations and improvements therein may be made by those skilled in the art, and are within the scope of the invention.

What is claimed is:

1. An article comprising:
   a substrate comprised of a silicon containing material;
   an environmental barrier coating (EBC) overlying the substrate; and
   a thermal barrier coating (TBC) on the environmental barrier coating, said thermal barrier coating comprising a compound consisting essentially of a rhombohedral phase,
   wherein said compound has the formula of: $A_4B_3O_{12}$, wherein A comprises at least one rare earth element; and B is selected from the group consisting of Zr, Hf and mixtures thereof, said TBC comprises a primary constituent portion and a stabilizer portion, said stabilizer portion of said TBC comprises an oxide of said at least one of rare earth element A, said primary constituent portion of said TBC consists of an oxide of B, to produce a stabilized hafnia, a stabilized zirconia or a mixture thereof on the EBC and
   wherein said primary constituent portion consists of hafnia or a mixture of zirconia and hafnia, or zirconia.

2. The article of claim 1, wherein the rare earth stabilizer element of A is selected from the group comprising at least one of : Yb, Ho, Er, Tm, Lu, and mixtures thereof.

3. The article of claim 2, further comprising additional rare earth oxides alloyed to said TBC compound, said additional rare earth oxides are selected from the group consisting of lanthana ($La_2O_3$), yttria ($Y_2O_3$), ceria ($CeO_2$), neodymia ($Nd_2O_3$), gadolinium oxide ($Gd_2O_3$) and dysprosia ($Dy_2O_3$), and any mixtures thereof.

4. The article of claim 2, wherein the at least one rare earth stabilizer element A is Yb.

5. The article of claim 2, wherein said stabilizer portion is included in an amount from about 35% by weight to about 75% by weight.

6. The article of claim 5, wherein said primary constituent portion consists of 95 mol % to about 100 mol % hafnia and 0 mol % to about 5 mol % zirconia and said stabilizer portion is included as ytterbium oxide in an amount from about 20 mol % to about 30 mol %.

7. The article of claim 1, wherein said primary constituent portion of said TBC consists of hafnia.

8. The article of claim 7, wherein the thermal barrier coating compound formed is $Yb_4Hf_3O_{12}$.

9. The article of claim 1, wherein said primary constituent portion of said TBC consists of zirconia.

10. The article of claim 1, wherein said primary constituent portion of said TBC consists of a mixture of zirconia and hafnia.

11. The article of claim 10, wherein said primary constituent comprises said zirconia in an amount of from about 0 mol % to about 95% mol % of the primary constituent, and wherein said hafnia is present in an amount from about 5 to about 100 mol % of the primary constituent.

12. The article of claim 11, wherein said primary constituent comprises said hafnia present in an amount of from about 95 mol % to about 100% mol % of the primary constituent and wherein said zirconia is present in an amount of about 0 mol % to about 5% mol % of the primary constituent.

13. The article of claim 1, wherein the compound of the thermal barrier coating has a rhombohedral crystalline structure with a hexagonal setting.

14. The article of claim 1, wherein the compound of the thermal barrier coating has a structure with a space group of R-3 and space group number of 148, and the coating is located on a gas turbine engine component.

15. The article as recited in claim 1, wherein said environmental barrier coating consists essentially of barium strontium aluminosilicate.

16. The article as recited in claim 1, wherein said environmental barrier coating consists of barium strontium aluminosilicate.

17. The article as recited in claim 1, wherein said environmental barrier coating is comprised of at least one of mullite, BSAS, rare earth aluminates, rare earth silicates, alkaline earth silicates and mixtures thereof.

18. The article as recited in claim 1, wherein said environmental barrier coating is a multiple layer EBC, wherein each layer of the multiple layer EBC is comprised of at least one of mullite, BSAS, rare earth aluminates, rare earth silicates, alkaline earth aluminates, alkaline earth silicates and mixtures thereof.

19. The article as recited in claim 1, further comprising a coefficient of thermal expansion (CTE) transition layer between said TBC and environmental barrier coating, said CTE transition layer having a CTE between that of the TBC and EBC.

20. The article as recited in claim 19, wherein said CTE transition layer comprises a TBC matching CTE and an EBC matching CTE portion, said TBC matching CTE portion comprising at least one of a metal oxide stabilized hafnia composition, a metal oxide stabilized zirconia composition, a metal oxide stabilized hafnia/zirconia composition and mixtures thereof, said EBC matching CTE portion comprising at least one of BSAS, mullite, alumina and any mixtures thereof.

21. The article as recited in claim 20, wherein said CTE transition layer is a substantially homogeneous mixture of the TBC matching CTE portion and the EBC matching CTE portion, with the TBC matching CTE portion constituting up to 90 weight percent of the CTE transition layer.

22. The article as recited in claim 20, wherein said CTE transition layer is comprised of a first and a second sublayer, said first sublayer contacts the EBC and said first sublayer comprises at least one of a metal oxide stabilized hafnia composition, a metal oxide stabilized zirconia composition, a metal oxide stabilized hafnia/zirconia composition and mixtures thereof, said second sublayer of the CTE transition layer is located on the first sublayer, said second sublayer comprises at least one of BSAS, mullite, alumina and any mixtures thereof.

23. The article as recited in claim 20, wherein said CTE transition layer has a continuously changing composition, wherein said CTE transition layer has a decreasing concentration of the EBC matching CTE portion and an increasing concentration of said TBC matching CTE portion in a direction away from the EBC.

24. The article as recited in claim 1, wherein said environmental barrier coating is a multi-layer coating comprising a first layer on the substrate and a second layer overlying the first layer, said first layer comprises at least one of $SiO_2$, mullite, mullite barium strontium aluminosilicate, mullite-yttrium silicate, mullite calcium aluminosilicate, silicon metal and mixtures thereof, and said second layer comprises barium strontium aluminosilicate.

25. The article as recited in claim 24, wherein said first layer of said EBC consists essentially of mullite-barium strontium aluminosilicate in an amount of between about 40 to 80 wt. % mullite and between about 20 to 60 wt. % barium strontium aluminosilicate.

26. The article as recited in claim 24, wherein said environmental barrier coating further comprises a bond layer between said substrate and said first layer of the environmental barrier coating, said bond layer comprises at least one of silicon metal and silicon dioxide.

27. The article as recited in claim 1, wherein the silicon containing material of said substrate is selected from the group consisting of metal matrix composites reinforced with at least one of silicon carbide, silicon nitride and silicon, composites having a matrix of at least one of silicon carbide, silicon nitride and silicon, composites with at least one of a silicon carbide, silicon nitride, silicon matrix reinforced with at least one of silicon carbide, silicon nitride and silicon, monolithic ceramics with at least one of silicon carbide, silicon nitride and silicon based metallics with at least one of niobium silicide and molybdenum silicide.

28. The article as recited in claim 1, wherein the article is a component of a gas turbine engine.

29. A gas turbine engine component formed of a silicon containing material and having a thermal/environmental barrier coating system on a surface thereof, the thermal/environmental barrier coating system comprising:
an environmental barrier coating (EBC) comprising a bond layer, a first layer and a second layer; said bond layer is located on the surface between the first layer and the substrate and comprises at least one of silicon metal and silicon dioxide, said first layer is located on said bond layer and comprises at least one of mullite, mullite-barium strontium aluminosilicate, mullite-yttrium silicate and mullite-calcium aluminosilicate in an amount of between about 40 to 80 wt. % mullite amd between about 20 to 60 wt. % barium strontium aluminosilicate, ytrium silicate or calcium aluminosilicate, said second layer of said EBC is located on said first layer of said EBC, said second layer comprises barium strontium aluminosilicate;
a thermal barrier coating (TBC) on the EBC, said TBC comprising a compound consisting essentially of a rhombohedral phase, said TBC comprising a primary constituent portion and a stabilizer portion stabilizing said primary constituent, said primary constituent portion of said thermal barrier coating comprises at least one of hafnia present in an amount of at least about 95 mol % of the primary constituent, zirconia present in an amount of at least about 100 mol % of the primary constituent, and a mixture of hafnia and zirconia wherein zirconia is present in an amount of from about 0 mol % to about 95% mol % of the primary constituent and wherein said hafnia is present in an amount from about 5 to about 100 mol % of the primary constituent, to produce a stabilized hafnia, a stabilized zirconia or a mixture thereof on the EBC, said stabilizer portion of said thermal barrier coating comprising at least one of :Yb, Ho, Er, Tm, Lu, and mixtures thereof present in the amount of about 35 to about 75% by wt of the thermal barrier coating;
wherein said compound has the formula of: $A_4B_3O_{12}$, wherein A comprises at least one rare earth element; and B is selected from the group consisting of Zr, Hf and mixtures thereof, said TBC comprises the primary constituent portion and the stabilizer portion, said stabilizer portion of said TBC comprises an oxide of said at least one of rare earth element A, said primary constituent portion of said TBC consists of an oxide of B, and
wherein said primary constituent portion consists of hafnia or a mixture of zirconia and hafnia, or zirconia; and
a coefficient of thermal expansion (CTE) transition layer between said TBC and said EBC, said CTE transition layer having a CTE between that of the TBC and EBC, said CTE transition layer comprises a TBC matching CTE portion and a EBC matching CTE portion, said TBC matching portion comprising at least one of a metal oxide stabilized hafnia composition, a metal oxide stabilized zirconia composition, a metal oxide stabilized hafnia/zirconia composition and mixtures thereof, said EBC matching CTE portion comprising at least one of BSAS, mullite, alumina and any mixtures thereof.

30. The gas turbine engine component as recited in claim 29, wherein said primary constituent comprises said mixture of said hafnia and said zirconia, said hafnia is present in an amount of from about 95 mol % to about 100% mol % of the primary constituent and wherein said zirconia is present in an amount of about 0 mol % to about 5% mol % of the primary constituent.

31. The gas turbine engine component as recited in claim 29, wherein said hafnia comprises about 100 mol % of the primary constituent.

32. The gas turbine engine component as recited in claim 29, wherein said stabilizer is $Yb_2O_3$ (Ytterbium Oxide).

33. The gas turbine component as recited in claim 29, wherein said primary constituent portion consists of 95 mol % to about 100 mol % hafnia and 0 mol % to about 5 mol % zirconia and said stabilizer portion is included as ytterbium oxide in an amount from about 20 mol % to about 30 mol %.

34. The gas turbine engine component as recited in claim 29, wherein the compound of the thermal barrier coating has a rhombohedral crystalline structure with a hexagonal setting.

35. The gas turbine engine component as recited in claim 29, wherein the compound of the thermal barrier coating has a structure with a space group of R-3 and space group number of 148.

36. An article comprising:

a substrate comprised of a silicon containing material;

an environmental barrier coating (EBC) overlying the substrate; and a thermal barrier coating (TBC) on the environmental barrier coating, said thermal barrier coating comprising a compound consisting essentially of a rhombohedral phase, wherein said compound has the formula of: $A_4B_3O_{12}$, wherein A comprises at least one rare earth element; and B is selected from the group consisting of Zr, Hf and mixtures thereof, said TBC comprises a primary constituent portion and a stabilizer portion, said stabilizer portion of said TBC comprises an oxide of said at least one of rare earth element A, said primary constituent portion of said TBC consists of an oxide of B;

wherein the rare earth stabilizer element of A is selected from the group comprising at least one of :Yb, Ho, Er, Tm, Lu, and mixtures thereof, and the primary constituent portion consists of 95 mol % to about 100 mol % hafnia and 0 mol % to about 5 mol % zirconia and the stabilizer portion is included as ytterbium oxide in an amount from about 20 mol % to about 30 mol % to produce a stabilized hafnia, a stabilized zirconia or a mixture thereof on the EBC.

37. An article comprising:

a substrate comprised of a silicon containing material;

an environmental barrier coating (EBC) overlying the substrate; and a thermal barrier coating (TBC) on the environmental barrier coating, said thermal barrier coating comprising a compound consisting essentially of a rhombohedral phase, wherein said compound has the formula of: $A_4B_3O_{12}$, wherein A comprises at least one rare earth element; and B is selected from the group consisting of Zr, Hf and mixtures thereof, said TBC comprises a primary constituent portion and a stabilizer portion to produce a stabilized hafnia, a stabilized zirconia or a mixture thereof on the EBC, said stabilizer portion of said TBC comprises an oxide of said at least one of rare earth element A, said primary constituent portion of said TBC consists of an oxide of B;

wherein the rare earth stabilizer element of A is selected from the group comprising at least one of :Yb, Ho, Er, Tm, Lu, and mixtures thereof, and the article further comprises additional rare earth oxides alloyed to said TBC compound, said additional rare earth oxides are selected from the group consisting of lanthana ($La_2O_3$), yttria ($Y_2O_3$), ceria ($CeO_2$), neodymia ($Nd_2O_3$), gadolinium oxide ($Gd_2O_3$) and dysprosia ($Dy_2O_3$), and any mixtures thereof.

\* \* \* \* \*